(12) United States Patent
Wada et al.

(10) Patent No.: US 9,213,362 B1
(45) Date of Patent: Dec. 15, 2015

(54) TOUCH PANEL AND FILM BODY

(71) Applicant: GUNZE LIMITED, Kyoto (JP)

(72) Inventors: Kenzo Wada, Kyoto (JP); Haruya Kakuta, Kyoto (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 14/305,368

(22) Filed: Jun. 16, 2014

(51) Int. Cl.
*G06F 3/041* (2006.01)
*G06F 1/16* (2006.01)

(52) U.S. Cl.
CPC ............... *G06F 1/16* (2013.01); *G06F 3/0412* (2013.01)

(58) Field of Classification Search
CPC .... Y10T 442/2984; G02B 1/105; G02B 1/12; G02B 1/113; G02B 2207/107; G02B 2207/109; G02B 5/0294; G02B 5/26; G02B 1/04; G02B 1/041; G02B 1/10; G02B 1/11; G02B 1/111; G02B 1/14; G02B 5/003; G02B 5/08
See application file for complete search history.

(56) References Cited

U.S. PATENT DOCUMENTS

| | | | | |
|---|---|---|---|---|
| 6,507,337 | B1* | 1/2003 | Sato et al. | 345/173 |
| 6,572,941 | B1* | 6/2003 | Murakami et al. | 428/34 |
| 2012/0229423 | A1* | 9/2012 | Takamiya et al. | 345/175 |
| 2013/0133933 | A1* | 5/2013 | Tsuno et al. | 174/255 |

FOREIGN PATENT DOCUMENTS

| | | |
|---|---|---|
| JP | 2000-089914 A | 3/2000 |
| JP | 2003-173238 A | 6/2003 |
| JP | 2004-042653 A | 2/2004 |
| JP | 2005-141325 A | 6/2005 |
| JP | 2011-133881 A | 7/2011 |
| JP | 2014-002520 A | 1/2014 |
| JP | 5440747 B2 | 3/2014 |
| WO | 2013/069683 A1 | 5/2013 |

OTHER PUBLICATIONS

An Office Action; "Notice of Reasons for Rejection," issued by the Japanese Patent Office on Jul. 9, 2014, which corresponds to Japanese Patent Application No. 2012-136859 and is related to U.S. Appl. No. 14/305,368.

* cited by examiner

*Primary Examiner* — Olga Merkoulova
(74) *Attorney, Agent, or Firm* — Studebaker & Brackett PC

(57) ABSTRACT

Provided is a touch panel and a film body, which ensure that a region where the touch panel and a display section are in contact with each other is hard to be conspicuous and that an apparatus formed by the touch panel and a display device can be made thinner. The touch panel is a transparent touch panel which is disposed with air gaps provided at predetermined intervals between the transparent touch panel and a surface of a display section of a display device, wherein a back surface of the transparent touch panel facing the surface of the display section is provided with a projection formation layer on which a plurality of fine projections protruding toward the surface side of the display section are dispersively formed, the surface of the projection formation layer is configured to have an average irregularity height (Ra) of equal to or more than 0.01 µm and equal to or less than 0.06 µm and a maximum irregularity height (Ry) of equal to or more than 0.15 µm and equal to or less than 0.70 µm, and the projections having a height of equal to or more than 0.1 µm are dispersed with a density of equal to or more than 100 and equal to or less than 180 per 1 mm².

4 Claims, 4 Drawing Sheets

TOUCH PANEL AND FILM BODY

BACKGROUND OF THE INVENTION (1) Field of the Invention

The present invention relates to a touch panel and a film body.

(2) Description of Related Art

Touch panels have been heretofore placed on display devices in, for example, game machines, portable information terminals, mobile phones, ticket-vending machines, conference tables, bank ATMs, personal computers, electronic notebooks, PDA, and so on, and widely used for performing operations of game machines and portable information terminals etc. Various studies have been heretofore conducted on the configuration of the touch panel, and for example, an electrostatic capacitance type touch panel, a resistance film type touch panel and the like are known. The electrostatic capacitance type touch panel is configured such that a dielectric layer is interposed between a pair of transparent planar bodies each including a transparent conductor having a predetermined pattern shape, and when a finger or the like touches an operation screen, a touch position is detected by utilizing a change in electrostatic capacity due to connection to the ground through a human body (for example FIG. 1 and FIG. 5 in Japanese Patent Laid-Open No. 2003-173238). The resistance film type touch panel is configured such that a transparent conductive film (resistance film) is provided on each of upper and lower transparent substrates, the transparent conductive films are made to face each other with an air layer held therebetween, and the transparent conductive films are brought into contact with each other by a pressing force to detect a touch position (FIG. 7 in Japanese Patent Laid-Open No. 2003-173238).

For example, as shown in the sectional view of FIG. 8, a touch panel 200 is mounted with a frame-shaped adhesive seal member 203, which is disposed on the outer edge portion of a display section 202 in a display device 201, interposed between the touch panel and the display section while an air gap (clearance) 204 is provided between a surface of the display section 202 and a back surface of the touch panel.

Here, surfaces of the touch panel 200 and the display section 201 have a slight distortion, and therefore when the touch panel 200 is placed on the display section 202 without providing the clearance 204, there exist a contact region where a back surface 200*a* of the touch panel 200 and a surface 202*a* of the display section 202 are in close contact with each other and a non-contact region where the back surface 200*a* and the surface 202*a* are not in close contact with each other. If the contact region is large enough to be visible, a boundary between the contact region and the non-contact region becomes conspicuous due to a difference between travel paths of light passing through the contact region and the non-contact region, so that an image or the like cannot be evenly displayed. For avoiding the above-mentioned situation, the touch panel 200 is mounted on the display section 202 with the clearance 204 provided between the surface of the display section 202 and the back surface of the touch panel 200.

However, concerning a touch panel placed with a clearance provided between the touch panel and a display section of a display device, there is the problem that it is difficult to maintain the clearance throughout the panel. Specifically, there is the possibility that the panel itself is warped or distorted as the touch panel is continuously used, or the touch panel is deformed at the time when the touch panel is pressed, and resultantly a part of the touch panel sticks to the surface of the display section, so that the back surface of the touch panel and the surface of the display section partially come into contact with each other as shown in FIG. 9. In a severe case, the touch panel persistently sticks on the surface of the display section, and it takes a long time until the original state is restored. In this case, there is the problem that due to a significant difference between travel paths of light in a region where the touch panel and the display section are in contact with each other (contact region) and a region where they are not in contact with each other (non-contact region), a boundary between the contact region and the non-contact region (hereinafter, referred to as a "water mark") becomes conspicuous. If the water mark is generated, the contrast or color tone of an image or the like displayed by the display section may become uneven, thus making it impossible to evenly display the image or the like.

For avoiding contact of the touch panel with the display section, the thickness of an adhesive seal member may be set so that the clearance between the touch panel and the display section becomes relatively large, but in this case, there is the problem that thinning of an apparatus formed by the touch panel and the display device is restricted.

Thus, concerning a touch panel placed with a clearance provided between the touch panel and a display section of a display device, it is difficult to ensure both that a region where the touch panel and the display section are in contact with each other is hard to be conspicuous and that an apparatus formed by the touch panel and the display device is made thinner.

SUMMARY OF THE INVENTION

Accordingly, an object of the present invention is to provide a touch panel and a film body, which ensure that a region where the touch panel and a display section are in contact with each other is hard to be conspicuous and that an apparatus formed by the touch panel and a display device can be made thinner.

The object of the present invention is achieved by a transparent touch panel which is disposed with air gaps provided at predetermined intervals between the transparent touch panel and a surface of a display section of a display device, wherein a back surface of the transparent touch panel facing the surface of the display section is provided with a projection formation layer on which a plurality of fine projections protruding toward the surface side of the display section are dispersively formed, the surface of the projection formation layer is configured to have an average irregularity height (Ra) of equal to or more than 0.01 μm and equal to or less than 0.06 μm and a maximum irregularity height (Ry) of equal to or more than 0.15 μm and equal to or less than 0.70 μm, and the projections having a height of equal to or more than 0.1 μm are dispersed with a density of equal to or more than 100 and equal to or less than 180 per 1 mm$^2$.

Preferably, the projection formation layer is formed by applying a resin composition containing fine particles having an average particle size of equal to or more than 1.5 μm and equal to or less than 3.5 μm.

Further, the object of the present invention is achieved by a film body which is placed on a transparent touch panel, the film body including:

a transparent film base material; and a projection formation layer formed on one surface of the film base material, wherein the surface of the projection formation layer is configured to have an average irregularity height (Ra) of equal to or more than 0.01 μm and equal to or less than 0.06 μm and a maximum irregularity height (Ry) of equal to or more than 0.15 μm and equal to or less than 0.70 μm, and fine projections having a height of equal to or more than 0.1 μm are dispersed with a density of equal to or more than 100 and equal to or less than 180 per 1 mm$^2$.

Preferably, the film body has a haze value of equal to or more than 0.3% and equal to or less than 1.0%.

According to the present invention, there can be provided a touch panel and a film body, which ensure that a region where the touch panel and a display section are in contact with each other is hard to be conspicuous and that an apparatus formed by the touch panel and a display device can be made thinner.

DETAILED DESCRIPTION OF PREFERRED EMBODIMENTS

Hereinafter, preferred embodiments of the present invention will be described with reference to the attached drawings. It is to be noted that the respective drawings are not based on an actual dimension ratio, but are partially scaled up or scaled down for easy understanding of the configuration.

Figure 1:
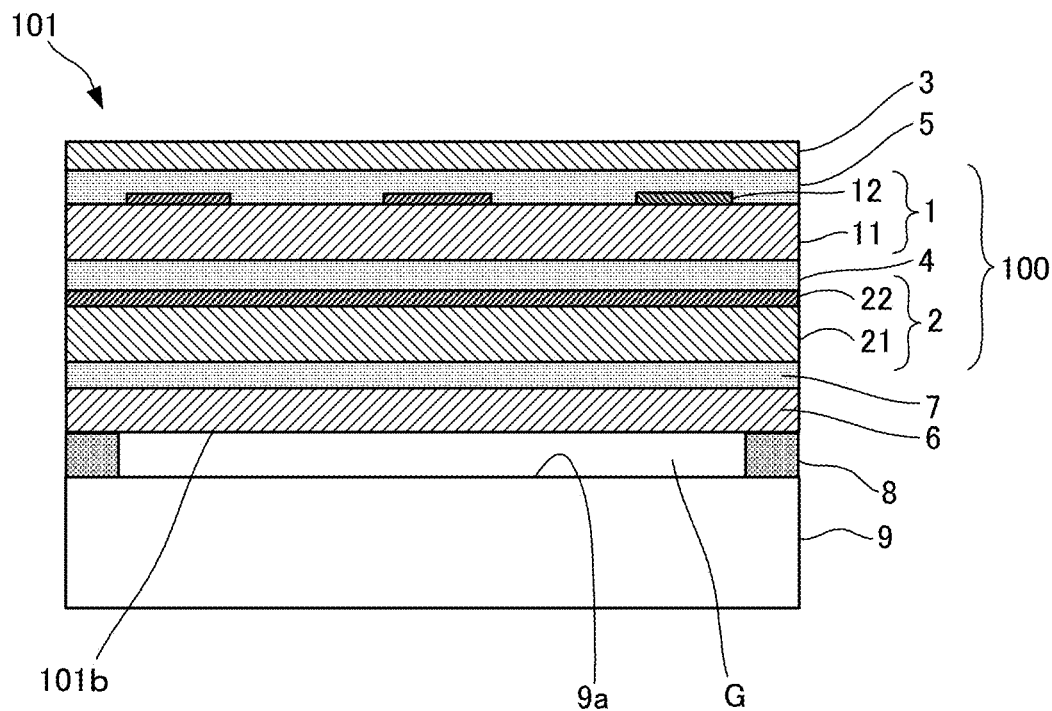
FIG. 1 is a schematic sectional view of a transparent touch panel according to one embodiment of the present invention.

FIG. 1 is a schematic block sectional view of a transparent touch panel according to one embodiment of the present invention. A transparent touch panel 101 is an electrostatic capacitance type touch panel, and includes a touch panel main body 100 and a film body 6. The touch panel main body 100 includes a first transparent planar body 1 and a second transparent planar body 2, and the first transparent planar body 1 includes a transparent substrate 11, and a transparent conductive film 12 patterned on one surface side of the transparent substrate 11. The second transparent planar body 2 has a configuration similar to that of the first transparent planar body 1, and includes a transparent substrate 21, and a transparent conductive film 22 patterned on one surface side of the transparent substrate 21.

The first transparent planar body 1 and the second transparent planar body 2 are bonded together with a pressure sensitive adhesive layer 4 interposed therebetween such that the other surface (surface that is not provided with the transparent conductive film 12) of the transparent substrate 11 in the first transparent planar body 1 and the transparent conductive film 22 in the second transparent planar body 2 face each other while being separated from each other as shown in FIG. 1. A protective layer 3 for protecting the transparent conductive film 12 is provided on the transparent conductive film 12 in the first transparent planar body 1 with a pressure sensitive adhesive layer 5 interposed therebetween. For the protective layer 3, various kinds of films subjected to surface treatment processing for improvement of scratch resistance, abrasion resistance, fingerprint resistance, non-glare characteristics and so on can be preferably used. The film body 6 is bonded to the other surface (surface that is not provided with the transparent conductive film 22) of the transparent substrate 21 in the second transparent planar body 2 with a pressure sensitive adhesive layer 7 interposed therebetween. The first transparent planar body 1 and the second transparent planar body 2 may be bonded together with the pressure sensitive adhesive layer 4 interposed therebetween such that the transparent conductive film 12 in the first transparent planar body 1 and the transparent conductive film 22 in the second transparent planar body 2 face each other while being separated from each other. Other possible configurations include a configuration in which in place of the first transparent planar body 1 and the pressure sensitive adhesive layer 4, a dielectric layer is provided on the second transparent planar body 2 (transparent conductive films 12 and 22 are disposed with dielectric layer interposed therebetween so as to face each other while being separated from each other), and a configuration in which patterns of the transparent conductive films 12 and 22 are provided on the transparent substrate 21 in the second transparent planar body 2 without providing the first transparent planar body 1 and the pressure sensitive adhesive layer 4 (patterns in the X direction and the Y direction are formed in one layer of transparent conductive film).

Preferably, the transparent substrates 11 and 21 each are a dielectric substrate that forms an insulating layer, and are composed of a material having high transparency. Specifically, the transparent substrate is formed from, for example, a flexible film made of a synthetic resin such as polyethylene terephthalate (PET), polyimide (PI), polyethylene naphthalate (PEN), polyether sulfone (PES), polyether ether ketone (PEEK), polycarbonate (PC), polypropylene (PP), polystyrene (PS), polyamide (PA), polyacryl (PAC), acryl, an amorphous polyolefin-based resin, a cyclic polyolefin-based resin, an aliphatic cyclic polyolefin, a norbornene-based thermoplastic transparent resin, or a laminate of two or more thereof, or a glass sheet such as that of soda glass, non-alkali glass, borosilicate glass or quartz glass. The thickness of the transparent substrates 11 and 21 is not particularly limited, but for example when the transparent substrates 11 and 21 are formed from a flexible film made of a synthetic resin, the thickness thereof is preferably about 10 μm to 500 μm, further preferably about 20 μm to 250 μm. When the transparent substrates 11 and 21 are formed from a glass sheet, the thickness thereof is preferably about 20 μm to 1000 μm. Preferably, the photorefractive index of the transparent substrates 11 and 21 is set to fall within a range of equal to or more than 1.4 and equal to or less than 1.7.

When the transparent substrates 11 and 21 are formed from a material having flexibility, a support may be bonded for imparting rigidity to the transparent substrates 11 and 21. Examples of the support may include glass sheets and resin materials having a hardness comparable to that of glass, and the thickness thereof is preferably equal to or more than 100 μm, more preferably 0.2 mm to 10 mm.

Examples of the material of the transparent conductive films 12 and 22 may include transparent conductive materials such as indium tin oxide (ITO), indium oxide, antimony-added tin oxide, fluorine-added tin oxide, aluminum-added zinc oxide, potassium-added zinc oxide, silicon-added zinc oxide, zinc oxide-tin oxide systems, indium oxide-tin oxide systems, zinc oxide-indium oxide-magnesium oxide systems, zinc oxide and tin oxide films, metallic materials such as those of tin, copper, aluminum, nickel and chromium, and metal oxide materials, and two or more thereof may be combined to form the transparent conductive film. A metal alone can be used as a conductive material.

A composite material obtained by dispersing ultrafine conductive carbon fibers such as carbon nanotubes, carbon nanohorns, carbon nanowires, carbon nanofibers or graphite fibrils, or ultrafine metallic fibers composed of a metallic base material such as silver in a polymer material serving as a binder can also be used as a material of the transparent conductive films 12 and 22. Here, as the polymer material, a conductive polymer can be employed such as polyaniline, polypyrrole, polyacetylene, polythiophene, polyphenylene vinylene, polyphenylene sulfide, poly-p-phenylene, polyheterocyclic vinylene or PEDOT: poly(3,4-ethylenedioxythiophene). A non-conductive polymer can be employed such as polyethylene terephthalate (PET), polyethylene naphthalate (PEN), polyether sulfone (PES), polyether ether ketone (PEEK), polycarbonate (PC), polypropylene (PP), polyamide (PA), polyacryl (PAC), polyimide, an epoxy resin, a phenol resin, an aliphatic cyclic polyolefin or a norbornene-based thermoplastic transparent resin.

Particularly when a carbon nanotube composite material obtained by dispersing carbon nanotubes in a non-conductive polymer material is employed as a material of the transparent conductive films 12 and 22, since the carbon nanotube is generally has a very small diameter of 0.8 nm to 1.4 nm (around 1 nm), it is preferred for securing transparency of the transparent conductive films 12 and 22 to disperse carbon nanotubes in the non-conductive polymer material one by one or on a bundle-to-bundle basis because the possibility is reduced that carbon nanotubes hinder light transmission.

Examples of the method for forming the transparent conductive films 12 and 22 may include PVD methods such as a sputtering method, a vacuum vapor deposition method and an ion plating method, CVD methods, coating methods and printing methods. Preferably, the thickness of the transparent conductive films 12 and 22 is set to fall within a range of equal to or more than 15 nm and equal to or less than 50 nm. Preferably, the photorefractive index of the transparent conductive films 12 and 22 is set to fall within a range of equal to or more than 1.9 and equal to or less than 2.3.

Figure 2:
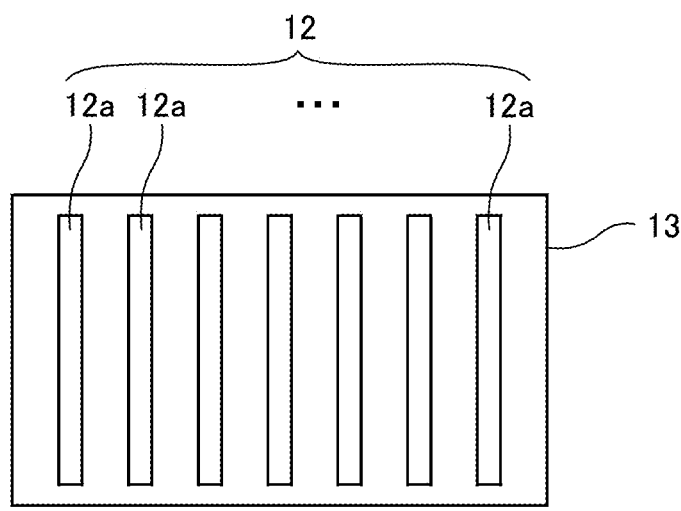
FIG. 2 is a plan view showing a part of the transparent touch panel shown in FIG. 1.
Figure 3:
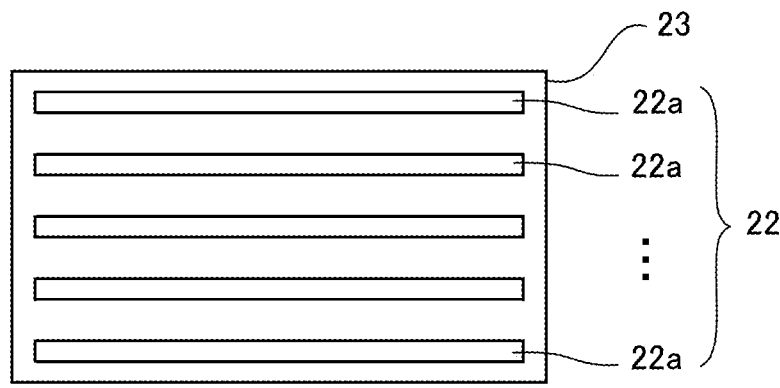
FIG. 3 is a plan view showing another part of the transparent touch panel shown in FIG. 1.
Figure 4:
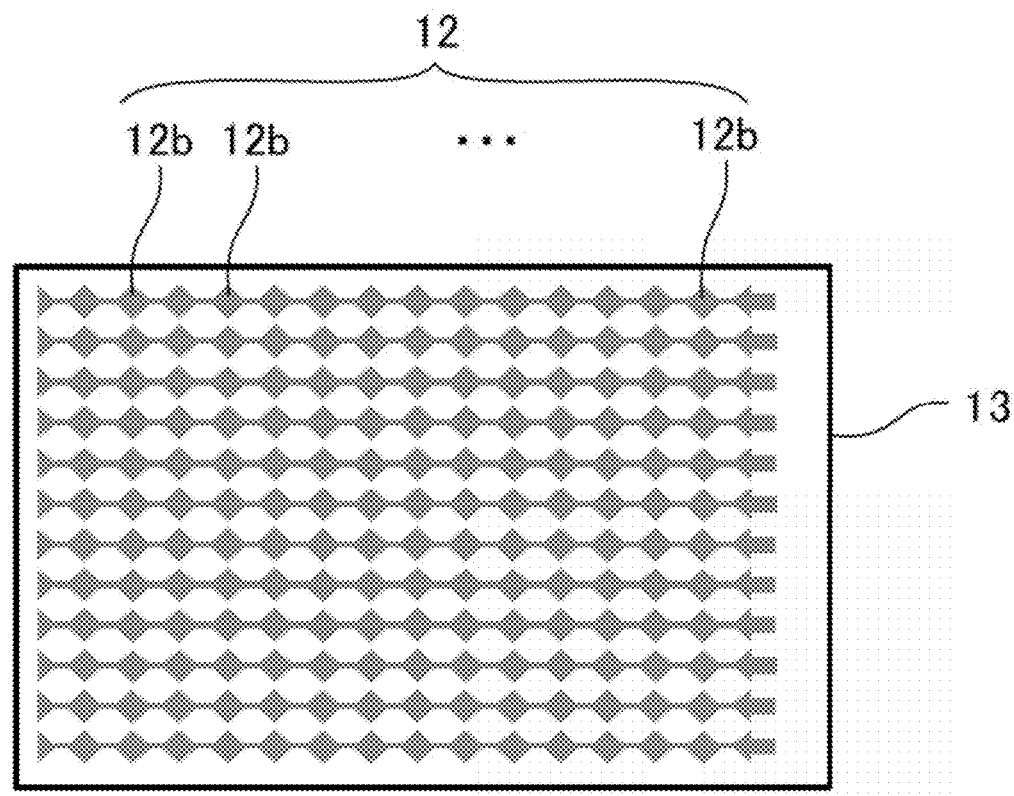
FIG. 4 is a plan view showing a part of a modification of the transparent touch panel shown in FIG. 1.
Figure 5:
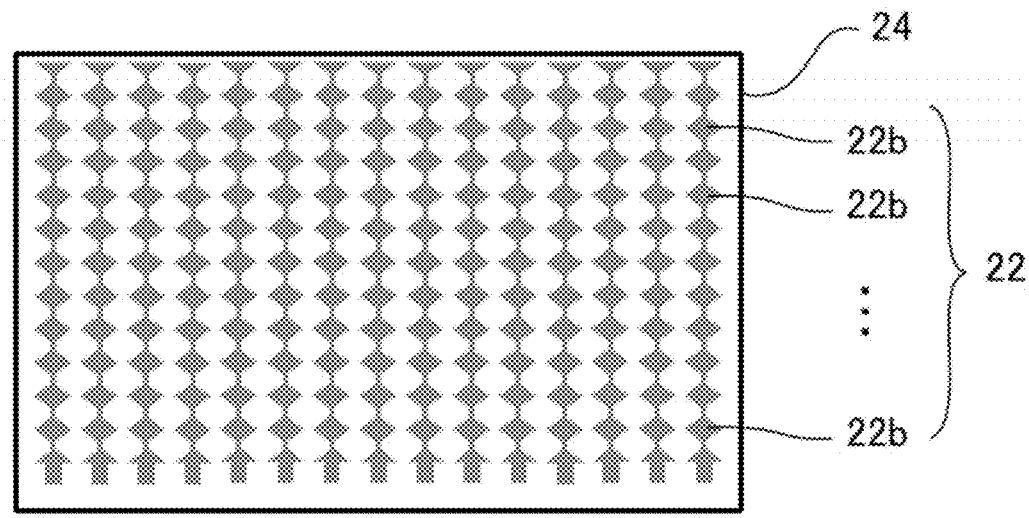
FIG. 5 is a plan view showing another part of the modification of the transparent touch panel shown in FIG. 1.

The transparent conductive films 12 and 22 are formed as assemblies of a plurality of belt-shaped conductive portions 12a and 22a extending in parallel as shown in FIG. 2 and FIG. 3, respectively, and the belt-shaped conductive portions 12a and 22a of the respective transparent conductive films 12 and 22 are disposed so as to orthogonally cross each other. The transparent conductive films 12 and 22 are each connected to an external drive circuit (not illustrated) through a drawing circuit (not illustrated) composed of a conductive ink or the like. The pattern shapes of the transparent conductive films 12 and 22 are not limited to those of this embodiment, and can be any shape as long as a contact point of a finger or the like can be detected. For example, as shown in FIG. 4 and FIG. 5, the transparent conductive films 12 and 22 may be configured such that a plurality of diamond-shaped conductive portions 12b and 22b are linearly coupled, where the coupling directions of the diamond-shaped conductive portions 12b and 22b in the respective transparent conductive films 12 and 22 orthogonally cross each other and the upper and lower diamond-shaped conductive portions 12b and 22b do not overlap one another in plane view. Operation performance, such as a resolution, of the transparent touch panel 101 is better when such a configuration is employed that regions having no conductive portion are decreased when the first transparent planar body 1 and the second transparent planar body 2 are superimposed on each other. In view thereof, as the pattern shape of the transparent conductive films 12 and 22, a configuration in which a plurality of the diamond-shaped conductive portions 12b and 22b are linearly coupled is more desirable than a rectangular configuration.

Patterning of the transparent conductive films 12 and 22 can be performed in the following manner: a mask portion having a desired pattern shape is formed on a surface of each of the transparent conductive films 12 and 22 formed on the transparent substrates 11 and 21, respectively, and exposed portions are etched away with an acid liquid or the like, followed by dissolving the mask portion with an alkali liquid or the like.

For the pressure sensitive adhesive layers 4, 5 and 7, general transparent adhesives (including pressure sensitive adhesives) can be used, and the layers may contain a core material composed of a transparent film of a norbornene-based resin. A plurality of sheet-shaped pressure sensitive adhesive materials are superimposed on one another to form the pressure sensitive adhesive layers 4, 5 and 7, and a plurality of different kinds of sheet-shaped pressure sensitive adhesive materials may also be superimposed on one another to form the pressure sensitive adhesive layers. The thickness of the pressure sensitive adhesive layers 4, 5 and 7 is not particularly specified, but is preferably equal to or less than 200 μm, particularly preferably 10 μm to 100 μm from a practical point of view.

Figure 6:
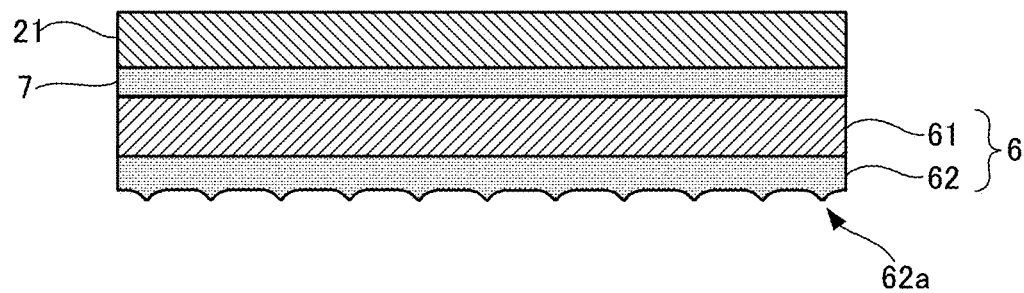
FIG. 6 is an enlarged sectional view of a principal part of a film body included in the transparent touch panel shown in FIG. 1.

As shown in FIG. 6, the film body 6 includes a film base material 61, and a projection formation layer 62 formed on at least one surface of the film base material 61. The film base material 61 is bonded to the second transparent planar body 2 with the pressure sensitive adhesive layer 7 interposed therebetween such that the projection formation layer 62 is situated on a display device 9 side. The exposed surface of the projection formation layer 62 is provided with a plurality of fine projections 62a, and is configured such that the average irregularity height (Ra) in JIS B0601 (1994), a surface roughness standard, is equal to or more than 0.01 μm and equal to or less than 0.06 μm. Further, the maximum irregularity height (Ry) in JIS B0601 (1994) is equal to or more than 0.15 μm and equal to or less than 0.70 μm. On the surface of the projection formation layer 62, projections 62a having a height of equal to or more than 0.1 μm are dispersed with a density of equal to or more than 100 and equal to or less than 180 per 1 $mm^2$. Here, the height of the projection 62a is a parameter actually measured by VK-X100 manufactured by KEYENCE CORPORATION. The interval between the projections 62a falls within a range of equal to or more than 10 μm and equal to or less than 35 μm. The interval between the projections 62a is a parameter corresponding to an average interval (Sm) between irregularities in JIS B0601 (1994), a surface roughness standard.

The projection formation layer 62 is formed by applying a predetermined resin composition to one surface of the transparent film base material 61. Examples of the application method include a roll coating method, a spin coating method, a coil bar method, a dip coating method and a die coating method. A method capable of continuous application, such as a roll coating method, is preferred from the viewpoint of productivity and production costs. Examples of the preferred resin composition applied to the film base material 61 may include resin compositions containing fine particles having an average particle size of equal to or more than 1.5 μm and equal to or less than 3.5 µm and a binder resin component. The average particle size is measured using a laser diffraction method (measurement apparatus: LA-920 manufactured by HORIBA, Ltd.). As the binder resin, a thermosetting resin, an ionizing radiation curable resin and the like can be used, and a single resin may be used, or a plurality of resins may be used in combination. Examples of the thermosetting resin may include resins such as thermosetting acrylic resins, thermosetting polyurethane resins, phenolic resins and thermosetting polyester resins. As the ionizing radiation curable resin, particularly ultraviolet curable resins are suitably used, and examples may include acryl-based ultraviolet curable resins, acryl urethane-based ultraviolet curable resins, polyester acrylate-based ultraviolet curable resins, epoxy acrylate-based ultraviolet curable resins and polyol acrylate-based ultraviolet curable resins. A photopolymerization initiator may be added as necessary. When an ultraviolet curable resin is used as the binder resin, the projection formation layer 62 can be formed in the following manner: the ultraviolet curable resin is applied to the film base material 61, dried for a predetermined period of time, and then irradiated with ultraviolet rays to be cured. Preferably, the thickness of the ultraviolet curable resin applied to the film base material 61 is set to fall within a range of, for example, equal to or more than 2 µm and equal to or less than 10 µm. Examples of the fine particles for formation of projections may include silica fillers, acryl beads and alumina fillers. For the fine particles contained in the resin composition, fine particles having an average particle size of 1.5 µm to 3.5 µm are set in an amount of preferably equal to or more than 1.0 part by weight and equal to or less than 5.0 parts by weight, more preferably equal to or more than 2.0 parts by weight and equal to or less than 4.0 parts by weight based on 100 parts by weight of the binder resin component. A coupling agent and a dispersant may be used for improving dispersibility of fine particles. Examples of the dispersant may include amide resins, acrylic resins and silicone resins. Here, the film base material 61 that forms the projection formation layer 62 can be formed from, for example, a flexible film made of a synthetic resin such as polyethylene terephthalate (PET), polyimide (PI), polyethylene naphthalate (PEN), polyether sulfone (PES), polyether ether ketone (PEEK), polycarbonate (PC), polypropylene (PP), polystyrene (PS), polyamide (PA), polyacryl (PAC), acryl, an amorphous polyolefin-based resin, a cyclic polyolefin-based resin, an aliphatic cyclic polyolefin, a norbornene-based thermoplastic transparent resin, or a laminate of two or more thereof, or a glass sheet such as that of soda glass, non-alkali glass, borosilicate glass or quartz glass. For example, the thickness of the film base material 61 is preferably about 30 µm to 250 µm.

The touch panel 101 having the above-mentioned configuration is placed on display devices in, for example, game machines, portable information terminals, mobile phones, ticket-vending machines, conference tables, bank ATMs, personal computers, electronic notebooks, PDA, and so on, and used for performing operations of game machines and portable information terminals etc. As shown in the sectional view of FIG. 1, the transparent touch panel 101 is mounted on display device with a frame-shaped adhesive seal member 8, which is disposed on the outer edge portion of a display section 9, interposed between the touch panel and the display section while an air gap G (clearance) is provided between a surface 9a of the display section 9 and a back surface 101b of the transparent touch panel 101. When the transparent touch panel 101 is placed on the surface side of the display section 9, a surface of the projection formation layer 62 (surface provided with a plurality of fine projections 62a) forms the back surface 101b of the transparent touch panel which faces the surface of the display section. The method for detecting a touch position on the transparent touch panel 101 is similar to that for a conventional electrostatic capacitance type touch panel, and a finger or the like touches the touch panel at any position on the surface side of the first transparent planar body 1, the transparent conductive films 12 and 22 are connected at the contact position to the ground through an electrostatic capacitance of a human body. A value of current through the transparent conductive films 12 and 22 is detected to calculate coordinates of the contact position.

Figure 7:
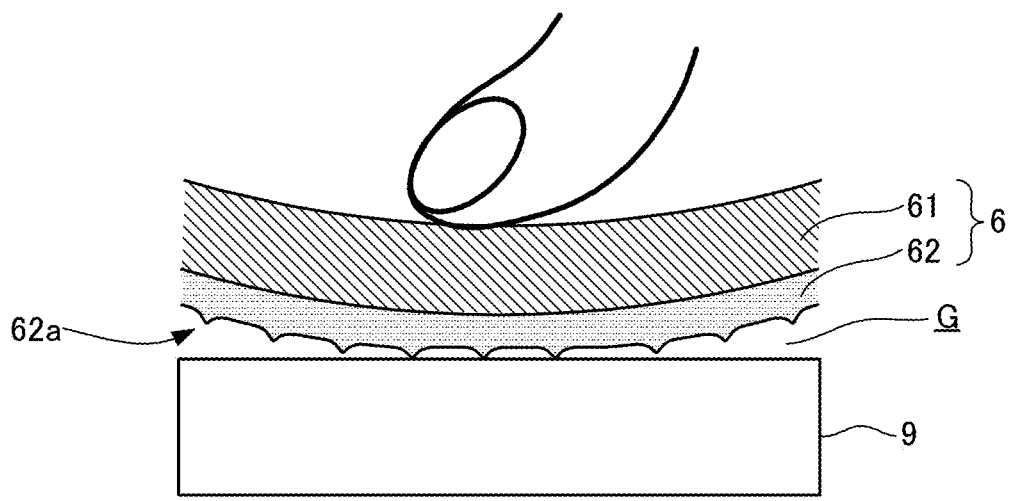
FIG. 7 is a schematic sectional view for explaining a state in which the back surface side of a transparent touch panel and a surface of a display section are in contact with each other.
Figure 8:
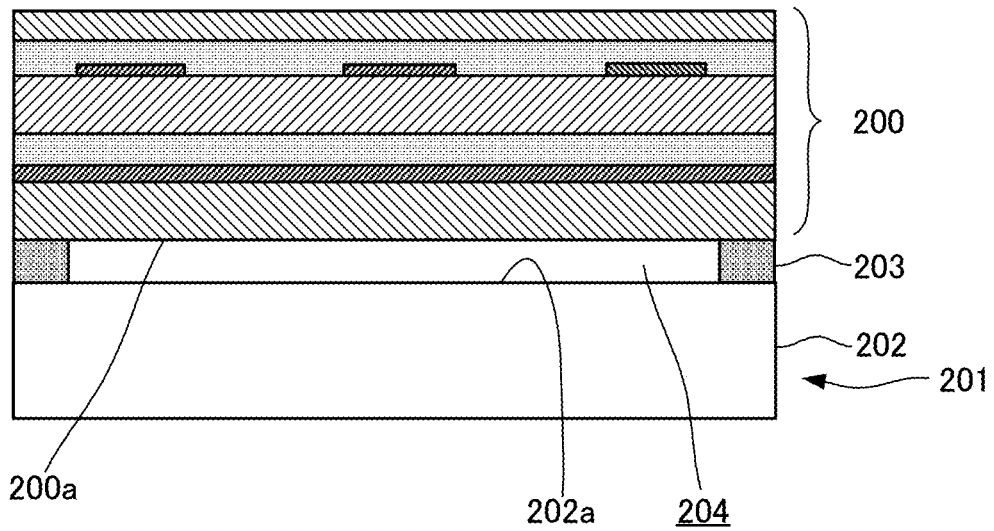
FIG. 8 is a sectional view showing a state in which a conventional touch panel is placed on a display section of a display device.
Figure 9:
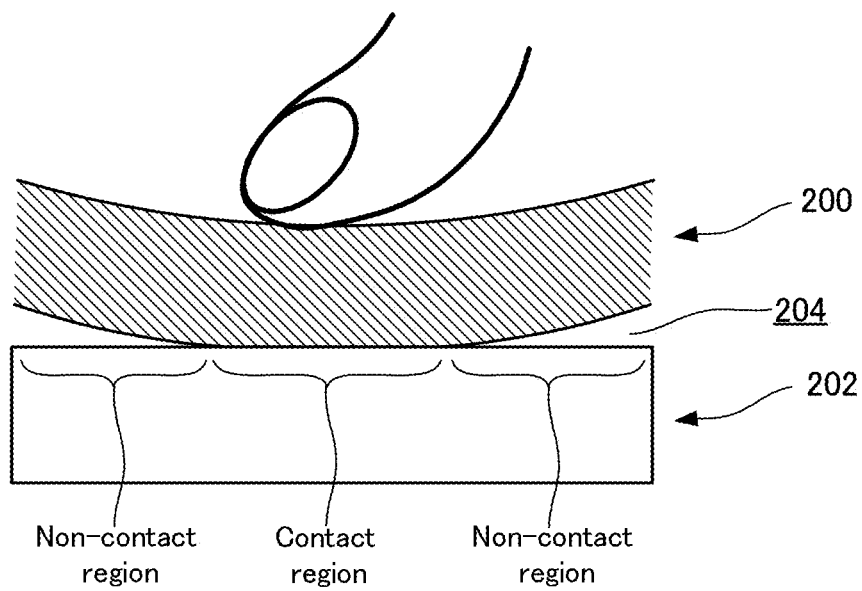
FIG. 9 is a schematic sectional view for explaining a state in which a back surface of a touch panel and a surface of a display section are in contact with each other.

The transparent touch panel 101 having the above-mentioned configuration is configured such that the exposed surface of the film body 6 (surface of the projection formation layer 62), on which a plurality of the fine projections 62a are dispersively formed, faces the surface of the display section of the display device with the air gap (clearance) interposed therebetween. Therefore, even if the transparent touch panel 101 is deformed by the pressing force of the touch panel 101, or the panel itself is warped or distorted due to continuous use of the transparent touch panel 101, so that the back surface side of the transparent touch panel 101 (exposed surface side of the film body 6) and the surface of the display section partially come into contact with each other, the surface of the display section and the fine protrusions 62a come into contact with each other as shown in the schematic sectional view of FIG. 7, so that contact between smooth surfaces is prevented, thus making it possible to effectively prevent generation of a water mark which has been a problem heretofore. As a result, the contrast or color tone of an image or the like displayed by the display section can be prevented from becoming uneven, so that visual recognizability of an image or the like can be improved. Further, since the film body 6 includes a film excellent in transparency, which has a haze value (parameter related to transparency of the film) of equal to or less than 1.0%, character information and image information displayed by the display section can be properly visually recognized.

The present inventors prepared a sample of the film body 6, attached the sample to a glass sheet having a thickness of 0.7 mm, placed the same on a display section of a liquid crystal display device (power source: OFF state) with the projections 62a situated on the liquid crystal display device side, and conducted a test for determining whether a so called water mark was generated or not.

Five kinds of samples (samples 1 to 5) were prepared. For explanation of individual samples, first the sample 1 was prepared in the following manner: a hard coat material, which did not contain fine particles for formation of projections, was formed in a thickness (thickness after curing) of 3.0 µm on one surface of the 50 µm-thick film base material 61 made of PET using a bar coater. The hard coat material was prepared by dissolving an acryl-based ultraviolet curable resin (100 parts by weight) and photopolymerization initiator (4 parts by weight) in a predetermined amount of an organic solvent (mixed solvent of methyl ethyl ketone (MEK) and methyl isobutyl ketone (MIBK)). Here, as the acryl-based ultraviolet curable resin, pentaerythritol triacrylate was used. As the photopolymerization initiator, IRGACURE 184 from BASF Ltd. was used. The hard coat material was applied to one surface of the film base material 61, and then dried with hot air for 2 minutes at a temperature ranging from 60 degrees to 100 degrees, and after completion of the drying step, ultraviolet rays were applied to cure the hard coat material. The integrated light amount of ultraviolet rays is 400 mJ/cm$^2$.

The sample 2 was prepared by including fine particles for formation of projections in the hard coat material of the sample 1. As the fine particles included in the hard coat material, a silica filler having an average particle size of 0.1 μm was used. The fine particles were included in an acryl-based ultraviolet curable resin (binder resin component) in an amount of 5 parts by weight based on 100 parts by weight of the acryl-based ultraviolet curable resin. The sample 2 was formed in the same manner as in the case of the sample 1 except that fine particles having an average particle size of 0.1 μm were added in an amount of 5 parts by weight based on 100 parts by weight of the acryl-based ultraviolet curable resin as described above. A layer formed from the hard coat material containing fine particles corresponds to the projection formation layer 62.

The sample 3 was prepared by including fine particles for formation of projections and a dispersant in the hard coat material of the sample 1. As the fine particles included in the hard coat material, a silica filler having an average particle size of 2 μm was used. The fine particles were included in an acryl-based ultraviolet curable resin (binder resin component) in an amount of 3 parts by weight based on 100 parts by weight of the acryl-based ultraviolet curable resin. As the dispersant, a silicone-based dispersant was included in an acryl-based ultraviolet curable resin in an amount of 0.3 parts by weight based on 100 parts by weight of the acryl-based ultraviolet curable resin. The sample 3 was formed in the same manner as in the case of the sample 1 except that fine particles having an average particle size of 2 nm were added in an amount of 3 parts by weight based on 100 parts by weight of the acryl-based ultraviolet curable resin and the silicone-based dispersant was added in an amount of 0.3 parts by weight based on 100 parts by weight of the acryl-based ultraviolet curable resin as described above. A layer formed from the hard coat material containing fine particles corresponds to the projection formation layer 62.

The sample 4 was prepared by including fine particles for formation of projections in the hard coat material of the sample 1. As the fine particles included in the hard coat material, a silica filler having an average particle size of 2 μm was used. The fine particles were included in an acryl-based ultraviolet curable resin (binder resin component) in an amount of 4 parts by weight based on 100 parts by weight of the acryl-based ultraviolet curable resin. The sample 4 was formed in the same manner as in the case of the sample 1 except that fine particles having an average particle size of 2 μm were added in an amount of 4 parts by weight based on 100 parts by weight of the acryl-based ultraviolet curable resin as described above. A layer formed from the hard coat material containing fine particles corresponds to the projection formation layer 62.

The sample 5 was prepared by including fine particles for formation of projections in the hard coat material of the sample 1. As the fine particles included in the hard coat material, a silica filler having an average particle size of 2 μm was used. The fine particles were included in an acryl-based ultraviolet curable resin (binder resin component) in an amount of 6 parts by weight based on 100 parts by weight of the acryl-based ultraviolet curable resin. The sample 5 was formed in the same manner as in the case of the sample 1 except that fine particles having an average particle size of 2 μm were added in an amount of 6 parts by weight based on 100 parts by weight of the acryl-based ultraviolet curable resin as described above. A layer formed from the hard coat material containing fine particles corresponds to the projection formation layer 62.

Each of the samples 1 to 5 prepared in the manner described above was placed on a glass sheet regarded as the display section of the display device, and a water mark generation state was visually evaluated when each sample was pressed with a finger. Each sample was placed without providing the air gap G (clearance) between the sample and the glass sheet. Evaluation results are shown in Table 1. Here, in Table 1, a sample, in which a water mark was not generated, was rated "◯", and a sample, in which visually slightly recognizable water mark was generated, was rated "Δ". A sample, in which a water mark large enough to be visually sufficiently recognizable was generated, was rated "x". The average irregularity height of the projections 62a (Ra), the maximum irregularity height of the projections 62a (Ry), the average distance between irregularities of the projections 62a (Sm) and the number of the projections 62a per 1 mm$^2$ (the number of the projections 62a in each of randomly selected three regions (region A, region B and region C) and the average number thereof) in each sample are collectively shown in Table 1. The average irregularity height of the projections 62a (Ra), the maximum irregularity height of the projections 62a (Ry) and the average distance between irregularities of the projections 62a (Sm) were measured using VK-X100 manufactured by KEYENCE CORPORATION, and an average value of measurements at ten locations was determined. The measurement method is based on JIS B0601 (1994). The number of the projections 62a per 1 mm$^2$ was determined in the following manner: points recognized as projections (those having a size of equal to or more than about 0.1 μm) in a region of 0.5 mm×0.7 mm were visually counted at a magnification of 400 using VK-X100 manufactured by KEYENCE CORPORATION, and an average value of measurements at three locations was calculated, and then corrected to a number per 1 mm$^2$.

For each of the samples 1 to 5, a haze value (%), i.e. a ratio of diffused and transmitted light to total transmitted light at the time of irradiating a film with visible light, and a transmittance (%) of visible light were measured, and optical characteristics of each sample were evaluated. Measurement results for the values are shown in Table 2. Since the haze value is a parameter related to transparency of the film, a sample having a haze value of equal to or less than 1.0% was rated "◯" as a sample having a satisfactory haze value, a sample having a haze value of more than 1.0% and less than 2.0% was rated "Δ", and a sample having a haze value of more than 2.0% was rated "x". For the transmittance, a sample having a transmittance of equal to or more than 90% was rated "◯" as a sample having a satisfactory transmittance, and a sample having a transmittance of less than 90% was rated "Δ". Here, the haze value and the transmittance were obtained by performing measurements using NDH 5000 manufactured by NIPPON DENSHOKU INDUSTRIES Co., LTD. The haze value was measured in accordance with JIS K7136, and the transmittance was measured in accordance with JIS K-7361-1. The results of visually evaluating glare with each sample placed on a liquid crystal display (LCD) are also collectively shown in Table 2. For glare, a sample having unnoticeable glare was rated "◯", a sample having slightly glare was rated "Δ", and a sample having intense and hence noticeable glare was rated "x".

TABLE 1

| | Ra (µm) Average irregularity height | Ry (µm) Maximum irregularity height | Sm (µm) Distance between irregularities | Number of projections/mm² | | | | Presence/ absence of water mark |
|---|---|---|---|---|---|---|---|---|
| | | | | Region A1 | Region B | Region C | Average | |
| Sample 1 | 0 | 0 | 0 | 0 | 0 | 0 | 0 | X |
| Sample 2 | 0.01 | 0.1 | 36 | 0 | 0 | 0 | 0 | Δ |
| Sample 3 | 0.04 | 0.4 | 20 | 151 | 134 | 169 | 151 | ○ |
| Sample 4 | 0.07 | 0.87 | 15.7 | 320 | 320 | 331 | 324 | ○ |
| Sample 5 | 0.18 | 1.6 | 11.4 | 8194 | 7491 | 8023 | 7903 | ○ |

"○": no water mark generated
"Δ": water mark slightly generated
"X": water mark large enough to be visually sufficiently recognizable generated

TABLE 2

| | Haze (%) | | Transmittance (%) | | LCD glare |
|---|---|---|---|---|---|
| Sample 1 | 0.2 | ○ | 91.6 | ○ | ○ |
| Sample 2 | 0.3 | ○ | 91.3 | ○ | ○ |
| Sample 3 | 0.4 | ○ | 91.5 | ○ | ○ |
| Sample 4 | 1.5 | Δ | 91.1 | ○ | Δ |
| Sample 5 | 6.8 | x | 89.6 | Δ | x |

As shown in Table 1, it is apparent that for samples 3 to 5, a water mark is not generated, and good results can be obtained. That is, it is apparent that when one related to the sample 3 is used as the film body 6 of a transparent touch panel that may come into contact with a surface of a display section, a region where the transparent touch panel and the display section are in contact with each other can be made hard to be conspicuous, and as a result, an apparatus formed by the touch panel and the display device can be made thinner.

As shown in Table 2, it is apparent that for samples 1 to 3, good results are obtained for all of the haze value, the transmittance and the glare. From these results, it is apparent that the sample 3 according to the present invention is a film body having extremely excellent optical characteristics because not only generation of a water mark can be prevented, but also a satisfactory haze value and transmittance are achieved, and also glare can be suppressed. When such a film body is applied to a touch panel main body, extremely satisfactory visual recognizability can be secured.

Embodiments of the transparent touch panel according to the present invention and the film body 6 in the transparent touch panel have been described above, but specific configurations are not limited to the embodiments described above. For example, the film body 6 may be configured such that an antireflection layer is further provided on a surface (surface provided with fine projections 62a) of the projection formation layer 62 in the film body 6. When such an antireflection layer is provided, light emitted from the display section provided with the transparent touch panel easily passes through the transparent touch panel, so that character information and image information displayed by the display section can be made easier to see. Here, the antireflection layer is formed by curing a coating solution for formation of low-refractive index layer, which contains silica fine particles, a binder component and so on. As the silica fine particles, a silica sol, porous silica fine particles, hollow silica fine particles and the like can be used. As the binder component, a single substance or a mixture of fluorine-containing organic compounds, or a single substance or a mixture or a polymer of fluorine-free organic compounds, etc. can be used. Examples of the method for forming an antireflection layer include a method in which the coating solution is applied onto a base material film by a roll coating method, a spin coating method, a coil bar method, a dip coating method, a die coating method or the like, dried, and then irradiated with ultraviolet rays. A method capable of continuous application, such as a roll coating method, is preferred from the viewpoint of productivity and production costs. Preferably, the thickness of the antireflection layer is designed so as to satisfy the relational expression of $nd=\lambda/4$ (where n represents a refractive index of the antireflection layer, d represents a thickness of the antireflection layer, and $\lambda$ represents a detection center sensitivity wavelength of reflected light in the antireflection layer) from the viewpoint of an antireflection (low reflection) function.

Here, the present inventors prepared a sample 6 by forming an antireflection layer on the surface of the projection formation layer 62 in the sample 3, place the sample to a glass sheet regarded as the display section of the display device, and conducted a test for determining whether a so called water mark was generated or not. The results thereof are shown in Table 3. The average irregularity height of the projections 62a (Ra), the maximum irregularity height of the projections 62a (Ry), the average distance between irregularities of the projections 62a (Sm) and the number of the projections 62a per 1 mm² (the number of the projections 62a in each of randomly selected three regions (region A, region B and region C) and the average number thereof) in the sample 6 are collectively shown in Table 3 as in the case of Table 1. The average irregularity height of the projections 62a (Ra), the maximum irregularity height of the projections 62a (Ry) and the average distance between irregularities of the projections 62a (Sm) were measured using VK-X100 manufactured by KEYENCE CORPORATION. The measurement method is based on JIS B0601 (1994). For the sample 6, the haze value (%) and the transmittance (%) of visible light were measured, and glare was visually evaluated with the sample 6 placed on a liquid crystal display (LCD). The results thereof are shown in Table 4. Here, the haze value and the transmittance were obtained by performing measurements using NDH 5000 manufactured by NIPPON DENSHOKU INDUSTRIES Co., LTD. The haze value was measured in accordance with JIS K7136, and the transmittance was measured in accordance with JIS K-7361-1. For "○", "Δ" and "x", i.e. symbols showing evaluation results in Table 3 and Table 4, results of rating samples are shown based on the same criteria as the evaluation criteria described above with regard to Table 1 and Table 2. The antireflection layer was formed on the surface of the projection formation layer 62 of the sample 3 so as to have a thickness of 0.1 µm using a coating solution obtained by dissolving an acryl-based ultraviolet curable resin (100 parts by weight of pentaerythritol triacrylate) and a photopolymerization initiator (4 parts by weight of IRGACURE 184 from BASF Ltd.) in a predetermined amount of an organic solvent (mixed solvent of methyl ethyl ketone (MEK) and methyl isobutyl ketone (MIBK)) and adding a hollow filler.

TABLE 3

| | Ra (μm) Average irregularity height | Ry (μm) Maximum irregularity height | Sm (μm) Distance between irregularities | Number of projections/mm² | | | | Presence/ absence of water mark |
|---|---|---|---|---|---|---|---|---|
| | | | | Region A1 | Region B | Region C | Average | |
| Sample 6 | 0.02 | 0.24 | 23 | 151 | 151 | 114 | 139 | ○ |

"○": no water mark generated
"Δ": water mark slightly generated
"X": water mark large enough to be visually sufficiently recognizable generated

TABLE 4

| | Haze (%) | | Transmittance (%) | | LCD glare |
|---|---|---|---|---|---|
| Sample 6 | 0.3 | ○ | 94.3 | ○ | ○ |

As shown in Table 3, it is apparent that the sample 6 does not generate a water mark, and shows good results. That is, it is apparent that when one related to the sample 6 is used as the film body 6 of a transparent touch panel that may come into contact with a surface of a display section, a region where the transparent touch panel and the display section are in contact with each other can be made hard to be conspicuous, and as a result, an apparatus formed by the touch panel and the display device can be made thinner.

As shown in Table 4, the sample 6 shows good results for all of the haze value, the transmittance and the glare. It is apparent that particularly the sample 6 has a high transmittance of 94.3%, so that character information and image information displayed by the display section can be made easier to see.

In the embodiment described above, the film body 6 with the projection formation layer 62 formed on one surface of the film base material 61 is configured to be bonded to the second transparent planar body 2 with the pressure sensitive adhesive layer 7 interposed therebetween, but the film body 6 and the pressure sensitive adhesive layer 7 may be omitted to form the projection formation layer 62 directly on the other surface of the transparent substrate 21 in the second transparent planar body 2. Even in this configuration, the fine projections 62*a* on the projection formation layer 62 provided on the transparent substrate 21 and the surface of the display section come into contact with each other, so that contact between smooth surfaces is prevented, thus making it possible to effectively prevent generation of a water mark which has been a problem heretofore.

What is claimed is:

1. A transparent touch panel which is disposed with air gaps provided at predetermined intervals between the transparent touch panel and a surface of a display section of a display device, wherein
 a back surface of the transparent touch panel facing the surface of the display section is provided with a projection formation layer on which a plurality of fine projections protruding toward the surface side of the display section are dispersively formed,
 the surface of the projection formation layer is configured to have
 an average irregularity height (Ra) of equal to or more than 0.01 μm and equal to or less than 0.06 μm and a maximum irregularity height (Ry) of equal to or more than 0.15 μm and equal to or less than 0.70 μm, and
 the projections having a height of equal to or more than 0.1 μm are dispersed with a density of equal to or more than 100 and equal to or less than 180 per 1 mm².

2. The transparent touch panel according to claim 1, wherein the projection formation layer is formed by applying a resin composition containing fine particles having an average particle size of equal to or more than 1.5 μm and equal to or less than 3.5 μm.

3. A film body which is placed on a transparent touch panel, the film body comprising:
 a transparent film base material; and a projection formation layer formed on one surface of the film base material, wherein
 the surface of the projection formation layer is configured to have
 an average irregularity height (Ra) of equal to or more than 0.01 μm and equal to or less than 0.06 μm and a maximum irregularity height (Ry) of equal to or more than 0.15 μm and equal to or less than 0.70 μm, and
 fine projections having a height of equal to or more than 0.1 μm are dispersed with a density of equal to or more than 100 and equal to or less than 180 per 1 mm².

4. The film body according to claim 3, wherein the film body has a haze value of equal to or more than 0.3% and equal to or less than 1.0%.

* * * * *